United States Patent
Perrone, Jr.

[11] Patent Number: 5,934,329
[45] Date of Patent: Aug. 10, 1999

[54] PEELING DIAPHRAGM FLUID RELEASE DEVICE

[76] Inventor: Jerome F. Perrone, Jr., 698 Redding Rd., West Redding, Conn. 06896

[21] Appl. No.: 08/980,886

[22] Filed: Dec. 1, 1997

[51] Int. Cl.[6] .................................................. F16L 55/04
[52] U.S. Cl. ............................. 138/30; 138/31; 137/797
[58] Field of Search .................... 138/30, 31; 137/68.14, 137/87.04, 225, 797

[56] References Cited

U.S. PATENT DOCUMENTS

| | | | |
|---|---|---|---|
| 1,974,323 | 9/1934 | Allen .................................. | 138/30 |
| 2,016,247 | 10/1935 | Simmons .............................. | 138/30 |
| 2,307,016 | 1/1943 | Boynton ............................. | 137/87.04 |
| 2,809,665 | 10/1957 | Crowe ................................. | 138/30 |
| 3,224,345 | 12/1965 | Doetsch .............................. | 138/30 |
| 3,915,235 | 10/1975 | Hamilton et al. ..................... | 169/28 |
| 3,934,602 | 1/1976 | Muddiman et al. .................... | 137/68 |
| 4,079,854 | 3/1978 | Shaw et al. .......................... | 220/89 |
| 4,152,786 | 5/1979 | Clark et al. .......................... | 138/30 |
| 4,394,926 | 7/1983 | Ou et al. .............................. | 220/89 |
| 4,657,157 | 4/1987 | Short .................................... | 220/89 |
| 4,759,460 | 7/1988 | Mozley ................................. | 220/89 |
| 4,836,168 | 6/1989 | Polster et al. ......................... | 138/30 |
| 4,877,048 | 10/1989 | Otlean et al. ......................... | 137/225 |
| 5,012,945 | 5/1991 | Keenan ................................. | 220/89 |
| 5,080,124 | 1/1992 | McGregor et al. .................... | 137/68 |
| 5,167,337 | 12/1992 | Short et al. ........................... | 220/89 |
| 5,267,666 | 12/1993 | Hinrichs et al. ...................... | 220/89 |
| 5,368,180 | 11/1994 | Farwell et al. ........................ | 220/89 |
| 5,538,478 | 7/1996 | Nakakubo et al. .................... | 138/30 |

*Primary Examiner*—James F. Hook

[57] ABSTRACT

The preferred embodiment of the invention is a fluid pressure alleviating pneumatic or hydraulic system component. The invention is comprised of a diaphragm, carrier and a release mechanism. The diaphragm is attached to the carrier. The release mechanism bears against the diaphragm and positions it such that fluid pressure on the surface of the diaphragm produces only or primarily shear force at the connection between the carrier and the diaphragm. The connection and parts have sufficient strength so that the fluid pressure can not shear the diaphragm from the carrier. When the fluid pressure becomes excessive the release mechanism, under force, retreats and allows the pressure of the fluid medium to translate the diaphragm into a position relative to the carrier that will invoke peel force between the carrier and the diaphragm. The characteristic of the joining method is such that it is much weaker in a peel mode than in a shear mode so that the fluid pressure is able to peel the diaphragm from the carrier and allow fluid medium to escape past the diaphragm.

14 Claims, 8 Drawing Sheets

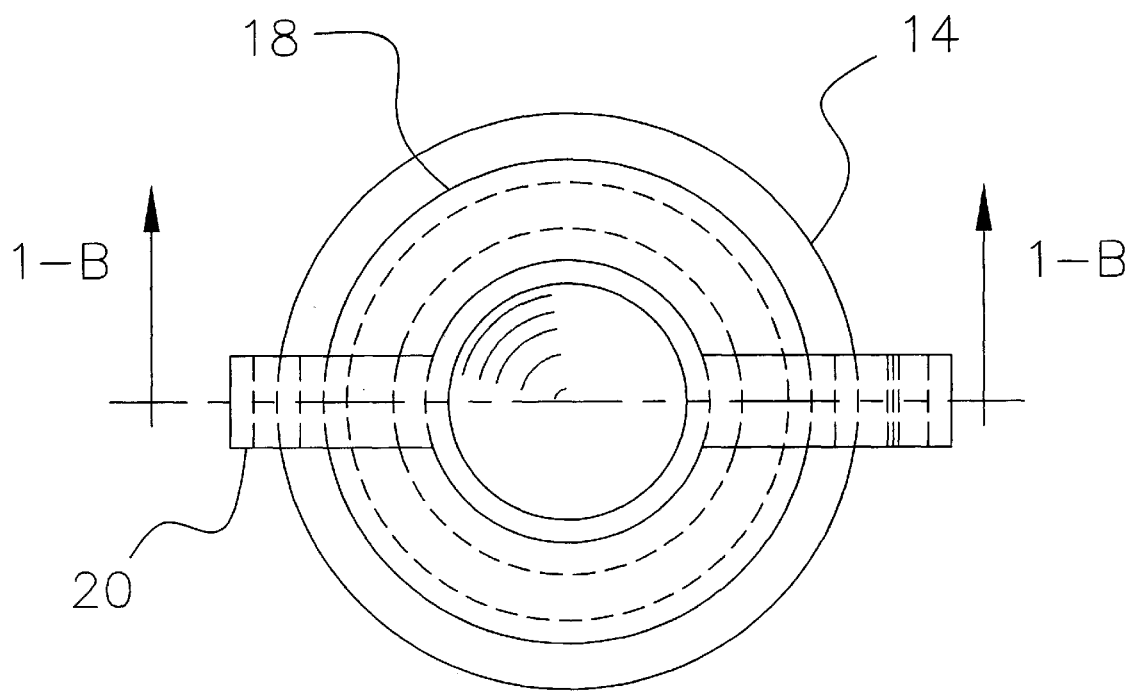
Fig. 1-A
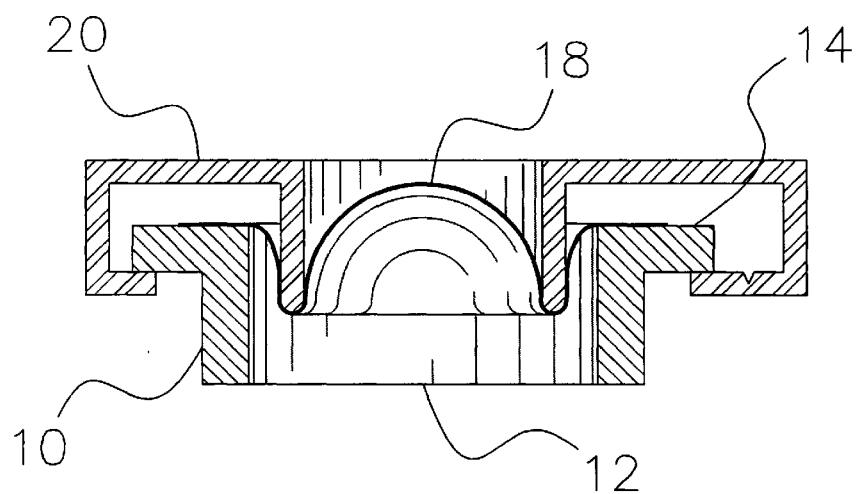
Fig. 1-B

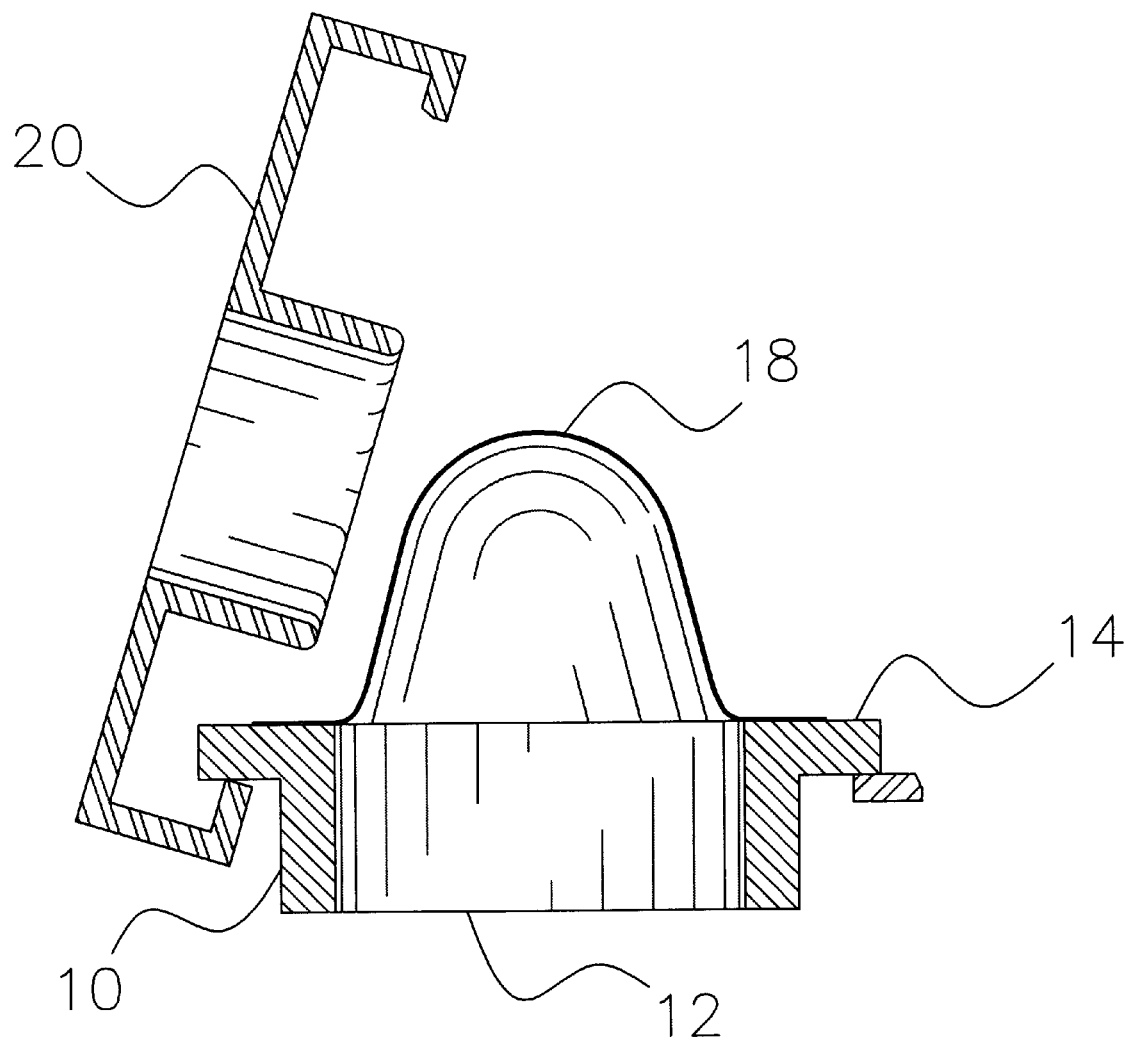
Fig. 1-C

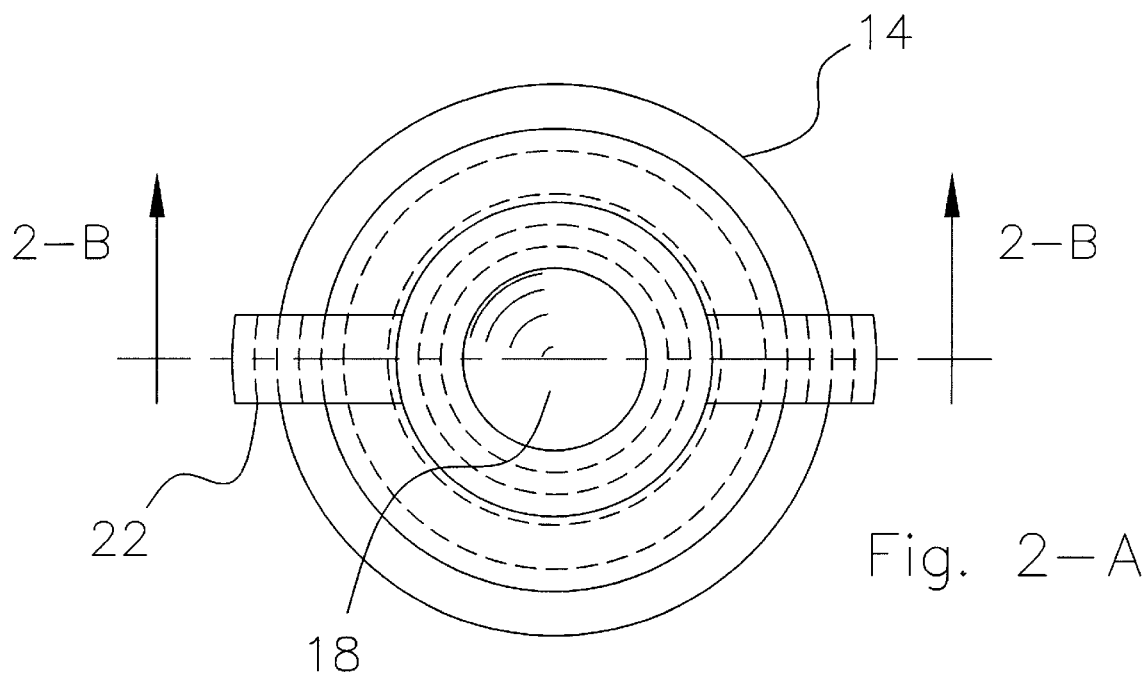
Fig. 2-A
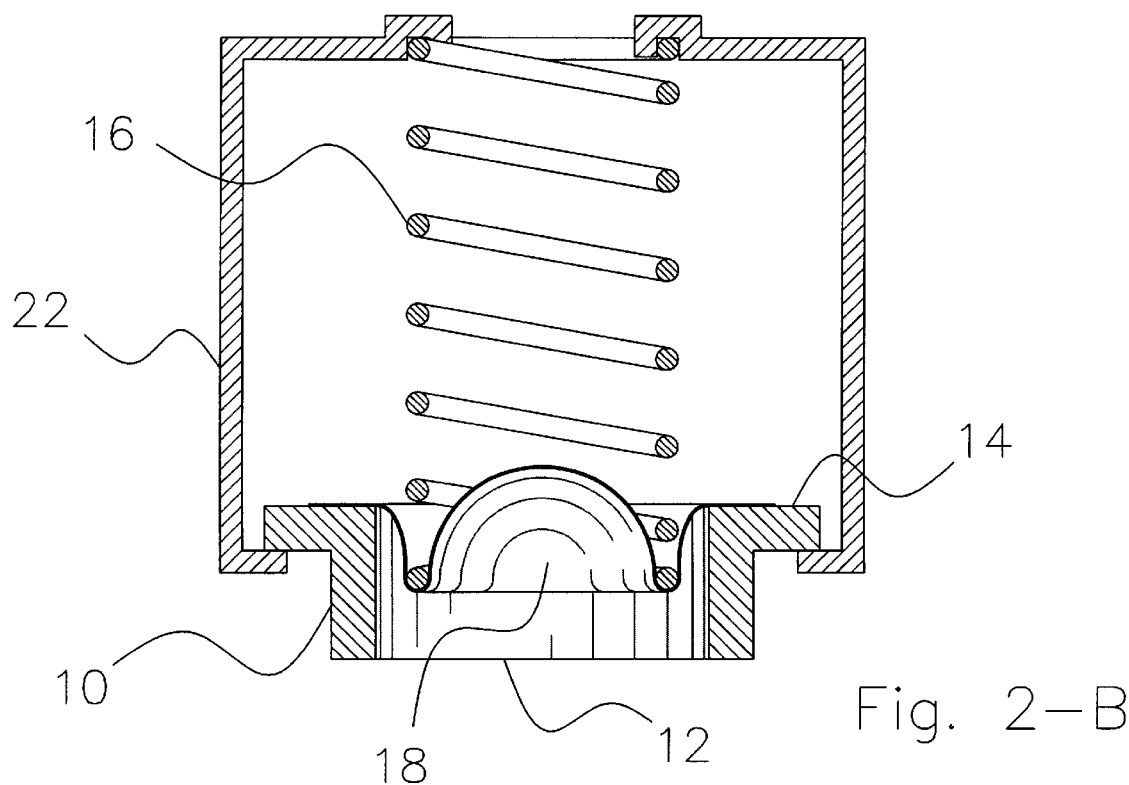
Fig. 2-B

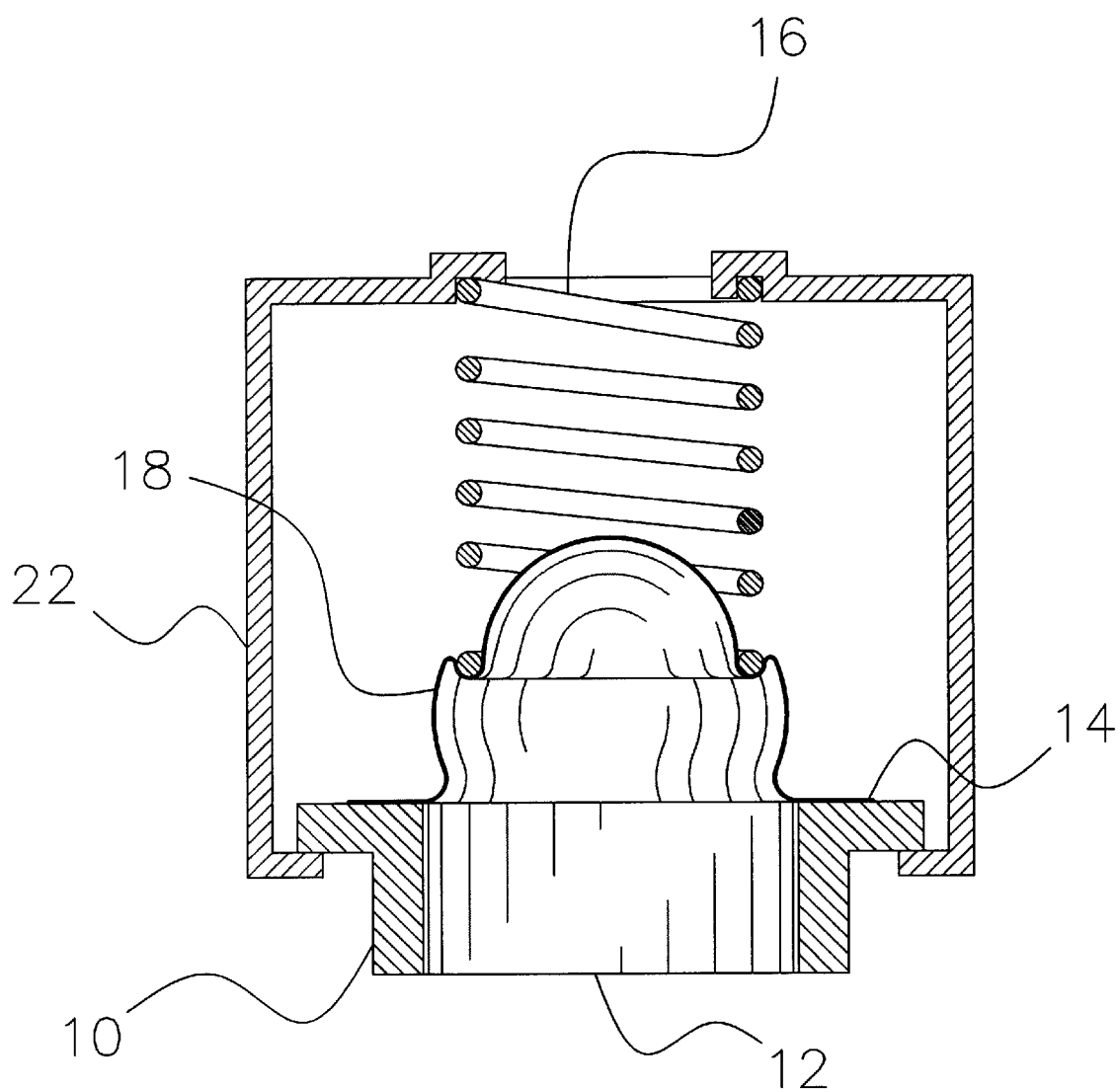
Fig. 2-C

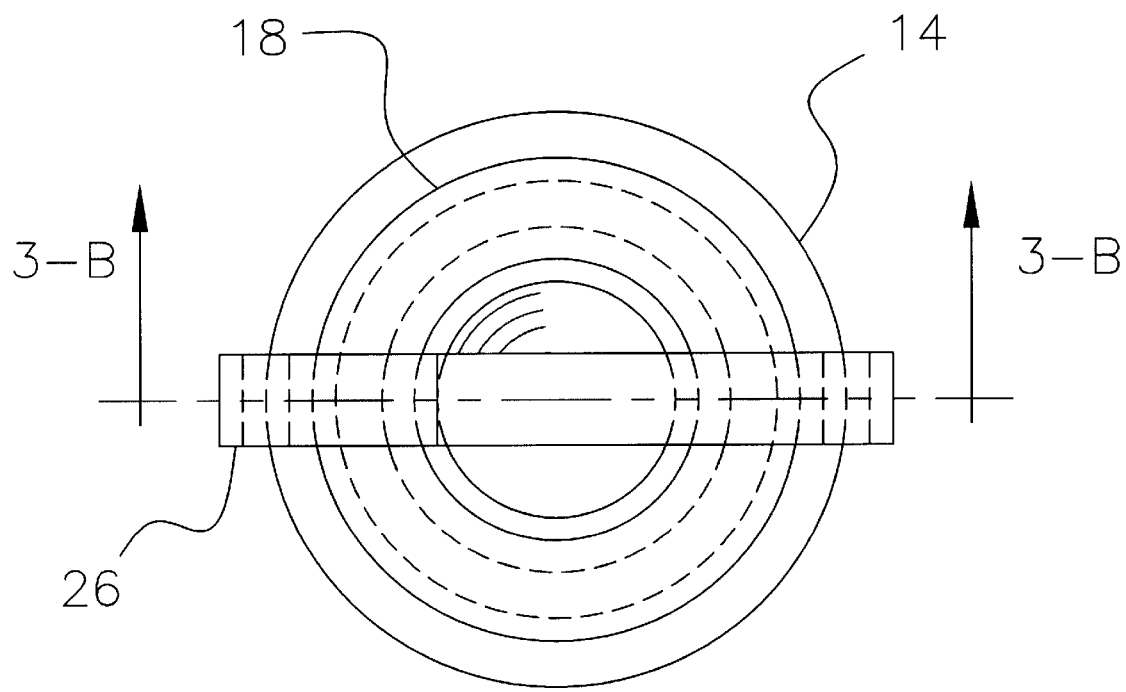
Fig. 3-A
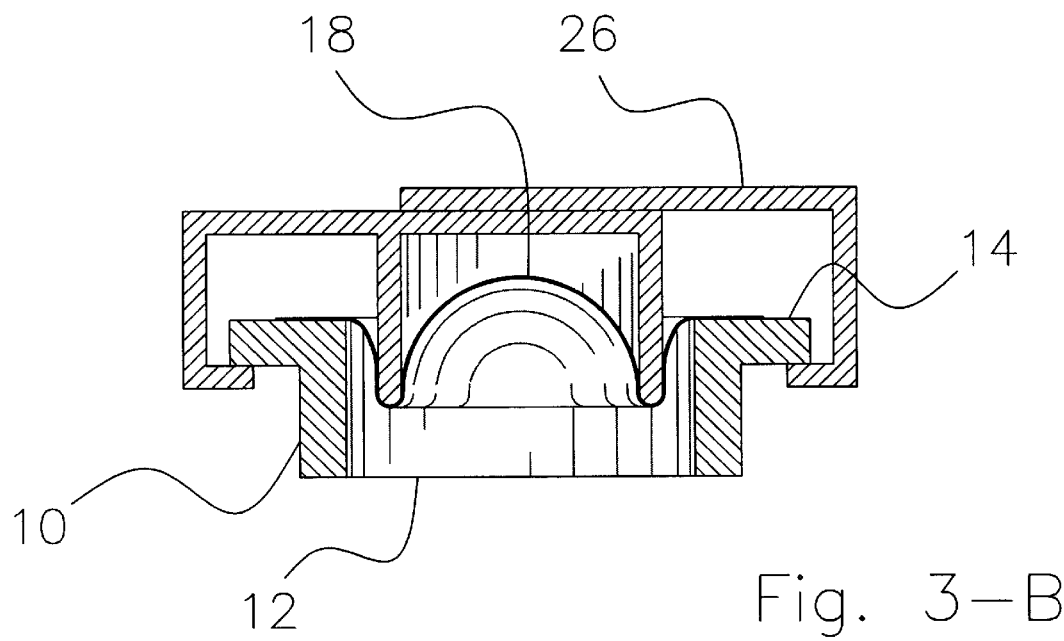
Fig. 3-B

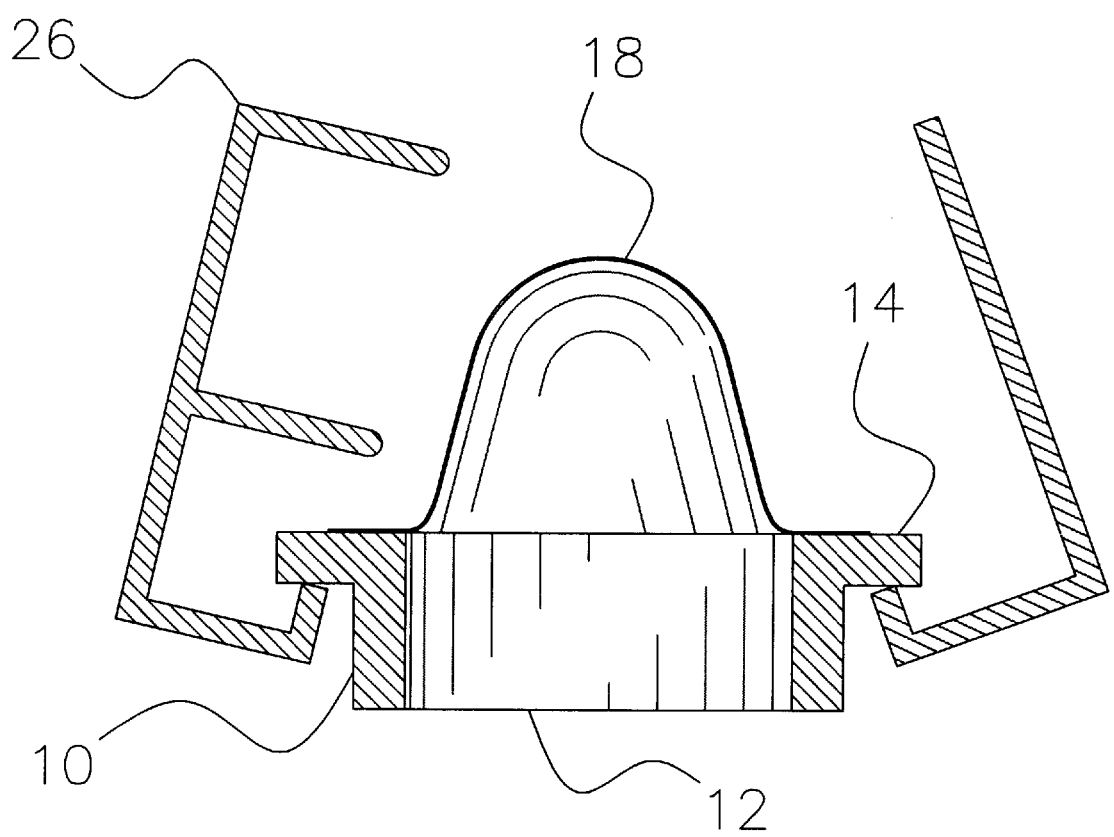
Fig. 3-C

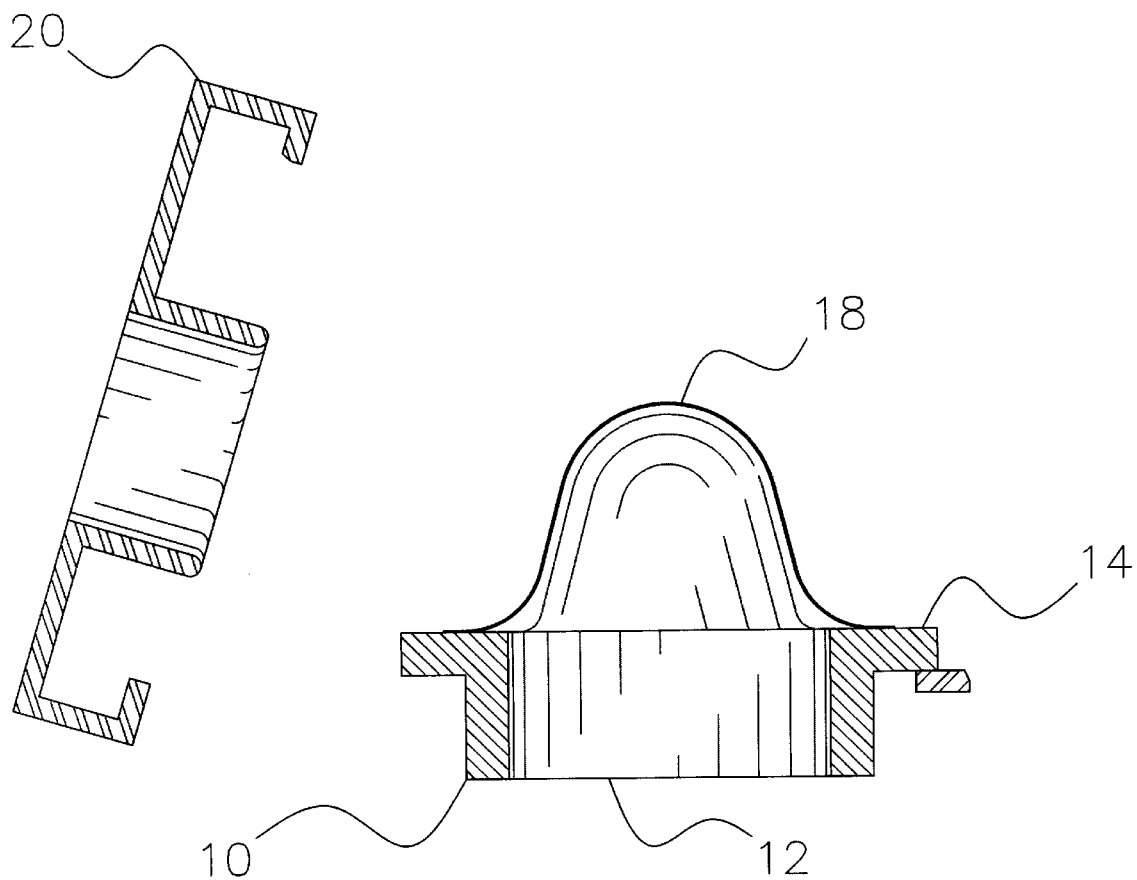
Fig. 4-A

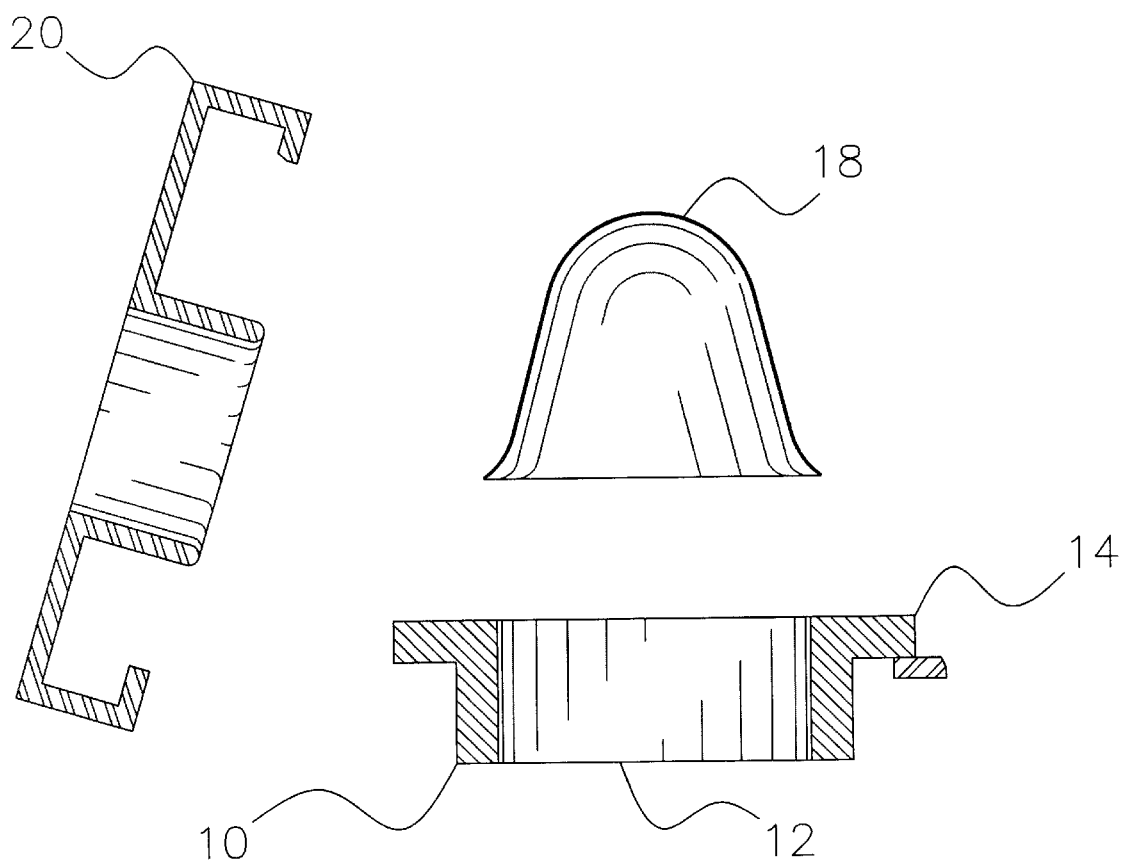
Fig. 4-B

PEELING DIAPHRAGM FLUID RELEASE DEVICE

BACKGROUND, FIELD OF INVENTION

This invention relates to the control of pressurized mediums, gaseous, liquid or other, specifically to an improved pressure relieving device or fluid releasing device.

BACKGROUND, DESCRIPTION OF PRIOR ART

Systems which make use of pressurized fluids must often incorporate a means of pressure relief to mitigate the consequences pressure in excess of a desirable level. This is necessary because excessive pressures in a system can result in damage and/or failure of the system as well as pose a threat to the safety of personnel. Prior art describes two types of inventions which have been used in such applications.

The first type is that of a relief valve or one similar device. These valves consist of several parts, some of which will move or be displaced when subject to pressure above a desired setpoint to create a path by which the overpressurized fluid can escape. This reduces the system pressure to a safe level.

Relief valves generally require many parts and as such are expensive. These valves are usually made of machined parts manufactured to tight tolerances. This is required so that the moving parts when seated at normal operating pressure will not leak. In most cases a factory adjustment is required to set the relief pressure and often periodic setpoint adjustments are necessary. These valves are prone to leaking when the sealing members deteriorate due to wear or corrosion. Since these valves require that the system pressure act on certain components of the valve so that the internal parts will move into a relieving position, there exists a time delay between the time that the valve is subject to the overpressure condition and when the valve begins to relieve the overpressure condition. This is largely a factor of the friction between components and the inertia of the parts which must be displaced.

The second type of relief device described in prior art are the frangible disc or rupture type as described in U.S. Pat. Nos. 3,915,235, 3,934,602, 4,079,854, 4,394,926, 4,657, 157, 4,759,460, 4,905,722, 5,012,945, and 5,080,124. This type has no moving parts. It generally consists of a thin disc formed into a dome shape, usually made of metal, and a holder. The holder retains the thin disc in such a manner that its concave side is in contact with the pressurized medium so that it forms a barrier between the pressurized medium and the relief path. When the system pressure reaches a given magnitude the disc by virtue of the pressure imposed on it by the fluid medium bursts, an action which allows the pressurized fluid to escape from the system. This will cause the system pressure to drop to safe levels.

The reliability of this device depends on the ability to manufacture the thin bursting disc to exact specifications of material, shape and dimension. The most minute deviation in any of the parameters of production will result in an actual burst pressure that is unpredictable, rendering the device ineffective. Industry practice would have discs from each manufactured batch tested in order to determine the actual burst pressure. The disc performance is so sensitive to the above mentioned parameters that design calculations and dimensional inspections have proven not to be an effective method of predicting actual disc performance.

When in use the disc is in physical contact with the pressurized fluid. In many applications the system fluid may be at a very high or a very low temperatures, or a changing temperature over time. This means that the temperature of the disc also fluctuates. When this occurs the strength and subsequent burst pressure of the disc varies so that the accuracy of the bursting disc pressure is reduced in these applications.

Since the disc is exposed to the pressurized fluid stream it is subject to wear and abrasion. If this wear reduces the thickness of the disc only slightly the actual bursting pressure of the disc will change unpredictably. Also, when the disc makes contact with the pressurized medium its material of construction may be chemically affected by the fluid. This means that the material of construction for the disc can not be chosen solely for having optimum mechanical qualities, but also for its chemical resistance which can become a limiting constraint. This limitation is sometimes overcome by the use of a liner attached to the disc which does not react with the fluid. This arrangement adds another variable which may affect actual burst pressure.

It is a characteristic of such thin discs that if exposed to pressures near the value of the bursting pressure for extended periods of time the disc will creep or stretch. When this occurs the actual bursting pressure is reduced. Typically the actual bursting pressure of this type of device will diminish if the disc is exposed to pressures as low as 70% of the rated bursting pressure. This condition imposes a restriction and limitation on the use of the device in that the maximum normal operating pressure of the system can not exceed 70% of the burst pressure. The disc is held so that the pressure being limited is imposed on the concave side of the disc.

In many applications the pressure imposed on the concave side of the disc fluctuates to the point that it can be less than the pressure on the convex side of the disc. Under this condition the domed shape of the disc can collapse, causing permanent damage that will adversely affect the actual burst pressure. It is also true that when the disc is exposed to sufficient pressure to induce it to rupture it can fragment into many pieces which are released into the flow of the relieving fluid. In some applications these fragments can damage components of the system that may come in contact with the relieving fluid path. Prior art of U.S. Pat. Nos. 5,167,337, 5,267,666, and 5,368,180 describes precision slits that are put into the surface of the disc which promote the rupturing of the disc to occur without generating disc fragments. These slits must be placed with tremendous precision which creates a substantial challenge and cost to manufacturing in order that they do not alter the actual burst pressure.

OBJECTS AND ADVANTAGES

Accordingly, several objects or advantages of the Peeling Diaphragm Fluid Release Device over the relief valve are as follows;

The peeling diaphragm fluid release device has very few parts so that it is much more economical to manufacture. The joints between the parts that create the pressure boundary of the system fluid are joined, sealed or adhered to each other. They do not depend on tight machining tolerances and surface conditions to prevent leaks. This advantage increases reliability and cost of manufacturing.

The Peeling Diaphragm Fluid Release Device does not require any factory or field adjustment of the actual relief pressure. It has few parts which the pressurized fluid must displace or move in order for the device to relieve pressure. Because there is a negligible inertial load or friction from any moving parts, the response to pressure is instantaneous.

Response time of the relief device is of particular importance where a system pressure is rising toward the relief pressure at a very fast rate. This is true because during the time after which the relief pressure is reached and the time the device actually begins to relieve, the system pressure may continue to rise to a point where damage or threat to safety may occur.

Accordingly, several objects or advantages of the Peeling Diaphragm Fluid Release Device over the bursting devices are as follows:

The operational reliability of the Peeling Diaphragm Fluid Release Device does not depend on the ability to manufacture a precision metal dome or disc to exacting tolerances and material specification such that it fails when subject to a predetermined system pressure. The peeling diaphragm of the invention utilizes a release mechanism which is not simultaneously utilized as a part of the pressure boundary for the system fluid as is the bursting disc of prior art. The release mechanism of the Peeling Diaphragm Fluid Release Device does not have the constraints that it must have a particular shape in order to seal fluid while exhibiting the physical characteristics that will result in exact reaction to mechanical forces. The release mechanism of the Peeling Diaphragm Fluid Release Device need only function as a control and not part of the pressure boundary in contact with the pressurized medium. Its shape, size and material of fabrication can be stipulated toward creating the most accurate mechanical resistance and response to system pressures. As such the release mechanism can take the form of a spring, cantilever arm, or other configuration.

The release mechanism is physically isolated from the fluid flow and is thermally isolated. This means that fluctuations in the fluid temperature do not create an adverse effect on the actual relieving pressure of the device. A greater accuracy over a wider temperature range can be expected. The release mechanism is not in physical contact with the fluid so there will be no tendency for it to wear over time, a condition that will deteriorate the accuracy of the actual relief pressure. Further the diaphragm which is in contact with the fluid medium need not be of a material and shape to result in a precise physical strength or rupture point; it can be chosen to have an appropriate chemical resistance to the fluid mediums in use.

The diaphragm does not rupture in the invention, so it can be designed to have a greater than sufficient yet an imprecise strength. The diaphragm will not have a tendency to creep at any pressure or temperature in the range of its potential use. Also the release mechanism will not be required to be shaped as a thin disc and can be designed so that it will not creep of any significant proportion when stressed very nearly to its limit. This means that the device can be used at pressures very close to its release pressure for extended periods of time without affecting its actual release pressure. Since the diaphragm need not be made of metal but instead can be made of a flexible or elastic material, the diaphragm when subject to inverting pressure differentials will move without damage or distortion to the diaphragm and its physical characteristics will remain constant. Since the diaphragm itself does not rupture into pieces upon relieving pressure, the device will not release fragments into the fluid stream.

Further objects and advantages of the Peeling Diaphragm Fluid Release Device will become apparent from consideration of the drawings and ensuing description.

DRAWING FIGURES

The features of the invention believed to be novel and the elements characteristic of the invention are set forth with particularity in the appended claims. The figures are for illustration purposes only and are not drawn to scale.

FIG. 1-A is a top view of the preferred embodiment of the invention with a mechanical release mechanism.

FIG. 1-B is a section view of the preferred embodiment of the invention with a mechanical release mechanism.

FIG. 1-C is a section view of the preferred embodiment of the invention with a mechanical release mechanism relieving under pressure.

FIG. 2-A is a top view of an alternative embodiment of the invention with a spring release mechanism.

FIG. 2-B is a section view of an alternative embodiment of the invention with a spring release mechanism.

FIG. 2-C is a section view of an alternative embodiment of the invention with a spring release mechanism relieving under pressure.

FIG. 3-A is a top view of an alternative embodiment of the invention with a melting release mechanism.

FIG. 3-B is a section view of an alternative embodiment of the invention with a melting release mechanism.

FIG. 3-C is a section view of an alternative embodiment of the invention with a melting release mechanism relieving under pressure.

FIG. 4-A is a section view of the preferred embodiment of the invention with a mechanical release mechanism peeling under pressure.

FIG. 4-B is a section view of the preferred embodiment of the invention with a mechanical release mechanism venting fluid.

REFERENCE NUMERALS IN DRAWINGS

10. Carrier
12. Carrier Inlet End
14. Carrier Outlet End
16. Spring
18. Diaphragm
20. Mechanical Release Mechanism
22. Spring Holder
26. Melting Release Mechanism

SUMMARY

A device for controlling the release of a fluid medium. A flexible diaphragm is partially attached to a ported carrier. A release mechanism holds the diaphragm so that when the diaphragm is used to retain a pressurized fluid, shear force is generated at it's attachment. The shear strength of the attachment is greater than the shear force imposed on it. At an increased level of pressure the release mechanism will yield and allow the diaphragm to be displaced. The new position of the diaphragm creates peel force at the attachment. In this mode the attachment will fail and the diaphragm will peel away from the carrier and allow the pressurized fluid to escape.

DESCRIPTION OF PREFERRED EMBODIMENT OF INVENTION

FIG. 1-A shows a top view of a typical Peeling Diaghram Fluid Release Device assembly. FIG. 1-B shows a sectional view of a typical Peeling Diaphragm Fluid Release Device. A carrier 10 is a rigid member having a carrier inlet end 12 suitable to make a connection to a conventional pressurized hydraulic or pneumatic fitting, port, or termination. For example carrier inlet end 12 of carrier 10 can be prepared with a National Pipe Thread (NPT), straight thread O-Ring, or a flanged termination or other so as to allow for its installation in a pressurized system having similar type mating ports. Carrier 10 is ported with solid walls such that pressurized fluid entering carrier inlet end 12 is able to flow through carrier 10 and out of a carrier outlet end 14 of carrier 10. A surface exists on carrier 10 adjacent to carrier outlet end 14. Upon this surface is joined a diaphragm 18. This joint or interface can be established with solder, cement, epoxy, casting, molding or any other suitable method. Diaghram 18 is a flexible mechanical element capable of retaining a pressurized medium when used in such a way as to create a pressure boundary by blocking carrier outlet end 14. Diaphragm 18 is continuously joined to the adjacent surface at carrier outlet end 14 so that there exists no leak path between the ported interior of carrier 10 and the area outside of carrier outlet end 14. Diaphragm 18 is shaped so that the position of its non-joined area can be controlled by a mechanical release mechanism 20. Mechanical release mechanism 20 is a mechanical element which is rigidly attached to the carrier 10. The mechanical release mechanism 20 is in physical contact with diaphragm 18. Mechanical release mechanism 20 is shaped and positioned so as to retain the non-adhered portion of diaphragm 18 in a particular orientation relative to the adjacent surface of carrier outlet end 14.

OPERATION OF PREFERRED EMBODIMENT OF INVENTION

Carrier 10 is used to connect the invention to a pressurized fluid system such that the pressurized fluid is able to enter carrier 10 but is contained by its walls and diaphragm 18. Carrier 10 also provides a surface of known configuration and location at carrier outlet end 14. This surface is used to receive the joined perimeter of diaphragm 18 so that pressurized fluid will not escape from the invention when it is installed in a pressurized system. The adjacent surface also provides for locating the adhered portions of diaphragm 18 in a precise orientation relative to the invention. Mechanical release mechanism 20 acts on the non-adhered portion of diaphragm 18 to hold it in a particular shape and orientation to the adhered edges of diaphragm 18. The induced shape of diaphragm 18 is such that when positive fluid pressure acts on its interior side, the resultant force imposed on the joint between diaphragm 18 and carrier 10 is that of pure or nearly pure shear. By design the shear strength of the joint must be sufficient to retain diaphragm 18 without failing when subject to a given fluid pressure and subsequent force, prior to mechanical release mechanism 20 yielding. Under normal operating pressures, mechanical release mechanism 20 must be of sufficient strength to maintain the appropriate shape and position of diaphragm 18 as described above. However mechanical release mechanism 20 must be of appropriate design so that it fails or significantly yields from a predictable higher fluid pressure imposing force via diaphragm 18. FIG. 1-C shows a sectional view of a typical Peeling Diaphragm Fluid Release Device immediately after mechanical release device 20 has yielded. When mechanical release mechanism 20 yields it will no longer restrain diaphragm 18. Diaphragm 18 will move or deflect due to the system pressure acting on its inner surface. Diaphragm 18 will invert and be held in position against the fluid pressure by the joint. The shape and position of diaphragm 18 is such that peel is now imposed between diaphragm 18 and carrier 10 as a result of the fluid pressure acting on diaphragm 18. The peel strength of the joining method is such that when mechanical release mechanism 20 yields the resultant peel force exceeds the peel strength of the joint as shown in FIG. 4-A. For example typical peel strength of adhesives is 10% of the adhesives shear strength. In this mode the joint will fail and diaphragm 18 will peel from carrier 10 as shown in FIG. 4-B. This will allow the pressurized system fluid previously contained by the invention to freely escape from the opening in carrier outlet end 14 of carrier 10.

DESCRIPTION OF ALTERNATE EMBODIMENT OF INVENTION WITH A SPRING RELEASE MECHANISM

FIG. 2-A shows a top view of an alternative embodiment of the invention where a spring 16 and spring holder 22 are used in place of mechanical release mechanism 20 of the preferred embodiment. FIG. 2-B shows a sectional view of the alternative embodiment. Spring 16 is in physical contact with diaphragm 18. Holder 22 retains spring 16 in position and is attached to carrier 10. Spring 16 is positioned so as to retain the non-adhered portion of diaphragm 18 in a particular position relative to the adjacent surface of carrier outlet end 14.

OPERATION OF ALTERNATE EMBODIMENT OF INVENTION WITH A SPRING RELEASE MECHANISM

Spring 16 acts on the non-adhered portion of diaphragm 18 to hold it in a particular shape and orientation to the adhered edges of diaphragm 18. The induced shape of diaphragm 18 is such that when positive fluid pressure acts on its interior side, the resultant force imposed on the adhesive is that of pure or nearly pure shear. When spring 16 yields under higher fluid pressure, diaphragm 18 will move or deflect. FIG. 2-C shows a sectional view of the alternative embodiment as the spring yields. Diaphragm 18 will invert and be held in position against the fluid pressure by the joint of diaphragm 18 and carrier 10. The shape and position of diaphragm 18 is such that peel is now imposed between diaphragm 18 and carrier 10. In this mode the joint will fail and diaphragm 18 will peel from carrier 10. This will allow the pressurized system fluid previously contained by the invention to freely escape from the opening in carrier outlet end 14 of carrier 10.

DESCRIPTION OF ALTERNATE EMBODIMENT OF INVENTION WITH A MELTING RELEASE MECHANISM AS A FIRE SPRINKLER

FIG. 3-A shows a top view of the alternate embodiment of the invention where a melting, fusible, or thermal release mechanism 26 is used in place of mechanical release mechanism 20 of the preferred embodiment. FIG. 3-B shows a sectional view of the alternative embodiment. Melting release mechanism 26 is in physical contact with diaphragm 18. Melting release device 26 is shaped and positioned so as to retain the non-adhered portion of diaphragm 18 in a particular position relative to the adjacent surface of carrier outlet end 14.

OPERATION OF ALTERNATE EMBODIMENT OF INVENTION WITH A MELTING RELEASE MECHANISM AS A FIRE SPRINKLER

Melting release mechanism 26 acts on the non-adhered portion of diaphragm 18 to hold it in a particular shape and orientation to the adhered edges of diaphragm 18. The induced shape of diaphragm 18 is such that when positive fluid pressure acts on its interior side, the resultant force imposed on the adhesive is that of pure or nearly pure shear.

When melting release device 26 is subject to an elevator temperature, it yields under fluid pressure and diaphragm 18 will move or deflect. FIG. 3-C shows a sectional view of the alternate embodiment after the melting release mechanism 26 has yielded. Diaphragm 18 will invert and be held in position against the fluid pressure by the joint between diaphragm 18 and carrier 10. The shape and position of diaphragm 18 is such that peel is now imposed between diaphragm 18 and carrier 10. In this mode the attachment fails and diaphragm 18 will peel from carrier 10. This will allow the pressurized system fluid previously contained by the invention to freely escape from the opening in carrier outlet end 14 of carrier 10.

CONCLUSION, RAMIFICATIONS, AND SCOPE OF THE INVENTION

Accordingly, the reader will see that the Peeling Diaphragm Fluid Release Device can be used to effectively control the release of a fluid medium and act to lower the system pressure with great accuracy and simple construction. The invention has the additional advantage in that the mass and inertia of the moving parts are slight and as such the response time is nearly instantaneous. The device requires no field adjustment or calibration. The controlling element (e.g. release mechanism) is not in physical contact with the fluid medium, so it is not adversely affected by fluid temperature or corrosion which would lead to inaccuracies of the device. The release mechanism, responsible for controlling release pressure and the diaphragm are separate parts and can be specialized in design to maximize their specific performance.

Although the description above contains many specifications, these should not be construed as limiting the scope of the invention but as merely providing illustrations of some of the presently preferred embodiments of this invention. For example the method of attachment between said carrier and said diaphragm could be soldering, molding, adhering, etc.. The release mechanism can take a number of forms and the materials of construction, the exact shape and relative sizes can vary. The device can be used to safeguard a fluid system from being overpressurized or to control the delivery of a fluid medium.

Thus the scope of the invention should be determined by the appended claims and their legal equivalents, rather than by the examples given.

I claim:

1. An apparatus for controlling the release of fluid, comprising:

means for retaining fluid with a diaphragm attached to a carrier;

means for positioning said diaphragm with a release mechanism so that fluid pressure results in shear force between said diaphragm and said carrier;

means of retracting said release mechanism and allowing fluid pressure to position said diaphragm so that peel force results between said diaphragm and said carrier.

2. An apparatus for controlling fluid as recited in claim 1, wherein said means for retaining fluid with a diaphragm attached to a carrier includes:

said diaphragm, having a flanged periphery;

said carrier having a surface suitable for attachment of said diaphragm so as to expose a or surface of said diaphragm to the fluid;

said flanged periphery of said diaphragm anchored and sealed to a surface of the said carrier; and an inlet end of said carrier appropriate for attachment or installation to a port of a fluid source.

3. An apparatus for controlling fluid as recited in claim 2, wherein said means for positioning said diaphragm with a release mechanism so that fluid pressure results in shear force between said diaphragm and said carrier includes:

said release mechanism which imposes a shape and position upon said diaphragm in a manner that will result in a shear force between said diaphragm and said carrier when a pressurized fluid is imposed on said diaphragm as permitted by said carrier; and said release mechanism is fixed to said carrier and is partially in contact with said diaphragm.

4. An apparatus for controlling fluid as recited in claim 3, wherein said means of retracting said release mechanism and allowing fluid pressure to position said diaphragm so that peel force results between said diaphragm and said carrier includes:

a mechanical release mechanism which allows said diaphragm to be displaced while under an elevated fluid pressure so that peel force of adequate strength to sever attachment between said diaphragm and said carrier, enabling pressure and fluid to relieve.

5. An apparatus for controlling fluid as recited in claim 3, wherein said means of retracting said release mechanism allowing fluid pressure to position said diaphragm so that peel force results between said diaphragm and said carrier includes:

a spring release mechanism which allows said diaphragm to be displaced while under an elevated fluid pressure so that peel force of adequate strength to sever attachment between said diaphragm and said carrier, enabling system pressure and fluid to relieve.

6. An apparatus for controlling fluid as recited in claim 3, wherein said means of retracting said release mechanism and allowing fluid pressure to position said diaphragm so that peel force results between said diaphragm and said carrier includes:

a melting release mechanism which allows said diaphragm to be displaced while at sufficiently elevated temperature so that peel force of adequate strength to sever attachment between said diaphragm and said carrier, enabling pressure and fluid to relieve.

7. A method for controlling the release of fluid, comprising the steps of:

retaining fluid with a diaphragm attached to a carrier;

positioning said diaphragm with a release mechanism so that fluid pressure results in shear force between said diaphragm and said carrier;

retracting said release mechanism allowing fluid pressure to position said diaphragm so that peel force results between said diaphragm and said carrier.

8. A method for controlling fluid as recited in claim 7, wherein said retaining fluid with a diaphragm attached to a carrier includes attaching and sealing periphery of said diaphragm to said carrier and installing said carrier into pressure boundary of fluid source so that one side of said diaphragm is exposed to the fluid pressure.

9. A method for controlling fluid as recited in claim 8, wherein said positioning said diaphragm with a release mechanism so that fluid pressure results in a shear force between said diaphragm and said carrier includes positioning said diaphragm with said release mechanism so that the result of fluid pressure on said diaphragm is shear force between said diaphragm and said carrier.

10. A method for controlling fluid as recited in claim 9, wherein said retracting said release mechanism allowing fluid pressure to position said diaphragm so that peel force results between said diaphragm and said carrier includes allowing an elevated fluid pressure to deflect or move a mechanical release mechanism so that significant peel force arises between said diaphragm and said carrier and venting of pressure and fluid occurs after a rise in peel force separates said diaphragm from said carrier.

11. A method for controlling fluid as recited in claim 9, wherein said retracting said release mechanism allowing fluid pressure to position said diaphragm so that peel force results between said diaphragm and said carrier includes allowing an elevated fluid pressure to deflect or move a spring release mechanism so that significant peel force arises between said diaphragm and said carrier and venting of pressure and fluid occurs after a rise in peel force separates said diaphragm from said carrier.

12. A method for controlling fluid as recited in claim 9, wherein said retracting said release mechanism allowing fluid pressure to position said diaphragm so that peel force results between said diaphragm and said carrier includes allowing an elevate temperature to melt a melting release mechanism allowing said diaphragm to deflect or move so that significant peel force arises between said diaphragm and said carrier and venting of pressure and fluid occurs after a rise in peel force separates said diaphragm from said carrier.

13. An apparatus for controlling the release of fluid comprising:

a diaphragm;

a carrier having an inlet end and an outlet end and a surface suitable for attachment to the periphery of said diaphragm so as to expose a surface of said diaphragm to a pressurized fluid;

said diaphragm is anchored and sealed to said surface of said carrier;

said inlet end of said carrier is appropriate for attachment or installation of said carrier to provide for fluid connection to a fluid source;

a mechanical release mechanism which imposes a shape and position upon said diaphragm in a manner that will result in a shear force between said diaphragm and said carrier when a pressurized fluid is imposed on said diaphragm as permitted by said carrier;

said mechanical release mechanism is fixed to the said carrier and is in contact with said diaphragm; and said mechanical release mechanism allows said diaphragm to be displaced while subject to elevated pressure so that peel force of sufficient magnitude to sever attachment between said diaphragm and said carrier results, enabling pressure and fluid to relieve.

14. A method for controlling the release of fluid, comprising the steps of:

attaching and sealing a diaphragm to a rigid carrier on its perimeter surface;

installing said carrier into a pressure boundary of a fluid system so that one side of said diaphragm is exposed to fluid pressure;

positioning said diaphragm with a mechanical release mechanism so that the result of the fluid pressure on said diaphragm is nearly pure shear force between said diaphragm and said carrier;

allowing an elevated fluid pressure to deflect or move said mechanical release mechanism so that peel force arises between said diaphragm and said carrier; and venting of pressure and fluid after rise in peel force separates said diaphragm from said carrier.

* * * * *